US012730394B2

(12) United States Patent
Kawanishi

(10) Patent No.: US 12,730,394 B2
(45) Date of Patent: Sep. 8, 2026

(54) IMAGE FORMING DEVICE

(71) Applicant: SHARP KABUSHIKI KAISHA, Sakai City (JP)

(72) Inventor: Tomoyuki Kawanishi, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 0 days.

(21) Appl. No.: 19/073,359

(22) Filed: Mar. 7, 2025

(65) Prior Publication Data

US 2025/0291280 A1 Sep. 18, 2025

(30) Foreign Application Priority Data

Mar. 12, 2024 (JP) ................................ 2024-038376

(51) Int. Cl.

| | |
|---|---|
| ***G03G 15/20*** | (2006.01) |
| ***G03G 15/00*** | (2006.01) |
| ***G03G 15/01*** | (2006.01) |
| ***G03G 15/16*** | (2006.01) |

(52) U.S. Cl.

CPC ..... *G03G 15/1615* (2013.01); *G03G 15/0131* (2013.01); *G03G 15/0189* (2013.01); *G03G 15/1675* (2013.01); *G03G 15/5016* (2013.01); *G03G 15/5054* (2013.01)

(58) Field of Classification Search

CPC ........... G03G 15/0131; G03G 15/0189; G03G 15/1615; G03G 15/1675; G03G 15/5016

USPC .................................................. 399/302, 308

See application file for complete search history.

(56) References Cited

U.S. PATENT DOCUMENTS 8,380,097 B2 * 2/2013 Seki .................. G03G 15/0136 399/302

FOREIGN PATENT DOCUMENTS

JP 2018-017995 A 2/2018

* cited by examiner

*Primary Examiner* — Hoan H Tran

(74) *Attorney, Agent, or Firm* — ScienBiziP, P.C.

(57) ABSTRACT

An image forming device includes: a process unit that includes a photoreceptor drum and forms a toner image on the photoreceptor drum; an intermediate transfer belt having a surface onto which the toner image on the photoreceptor drum is intermediately transferred; an intermediate transfer roller whose position can be manually switched between a first position at which the surface of the intermediate transfer belt is brought into contact with the photoreceptor drum and a second position at which the intermediate transfer belt is separated from the photoreceptor drum; an image density sensor being a sensor that detects the toner image on the intermediate transfer belt, a position of the image density sensor relative to the intermediate transfer belt varying depending on whether the intermediate transfer roller is located at the first position or at the second position; and a controller that determines whether the intermediate transfer roller is located at the first position or at the second position based on a detection value of the image density sensor.

7 Claims, 12 Drawing Sheets

IMAGE FORMING DEVICE

TECHNICAL FIELD

The present disclosure relates to an image forming device of an intermediate transfer type.

BACKGROUND ART

A known image forming device of an intermediate transfer type intermediately transfers a toner image formed on a photoreceptor (image carrier) onto an intermediate transfer belt (primary transfer), and further transfers the toner image intermediately transferred to the intermediate transfer belt onto a recording sheet (secondary transfer). In some image forming devices of an intermediate transfer type, an intermediate transfer belt can be manually switched between a press-contact state and a separated state with respect to a photoreceptor. While switching between press-contact and separation of the intermediate transfer belt with respect to the photoreceptor is performed by manually changing the position of an intermediate transfer roller, if an image forming operation is performed without returning to the press-contact state, a toner image formed on the photoreceptor is not transferred onto the intermediate transfer belt as a matter of course, that is, toner is used wastefully.

Another known image forming device capable of press-contact or separation with respect to an intermediate transfer belt determines press-contact or separation of a transfer (secondary transfer) roller, which transfers a toner image intermediately transferred to the intermediate transfer belt onto a recording sheet, by using an image density sensor. Such an image forming device determines that the transfer (secondary transfer) roller is in a press-contact state when, for the toner image intermediately transferred to the intermediate transfer belt, the toner density on the intermediate transfer belt passing the transfer (secondary transfer) roller is low, and determines that the transfer (secondary transfer) roller is in a separated state when the toner density on the intermediate transfer belt is high.

SUMMARY

Technical Problem

In the above-described image forming device, an operation of intermediately transferring a toner image from the photoreceptor to the intermediate transfer belt (primary transfer) is necessary, and toner is consumed for the determination.

The disclosure has been made in view of the above-described problem, and an object of the disclosure is to provide an image forming device capable of determining whether an intermediate transfer roller is in a pressed contact state or a separated state with respect to an image carrier.

Solution to Problem

In order to solve the above-described problem, an image forming device of the disclosure includes: an image former including an image carrier and forming an toner image on the image carrier; an intermediate transfer belt on which the toner image on the image carrier is intermediately transferred, the intermediate transfer belt being stretched over a plurality of rollers; an intermediate transfer roller whose position can be manually switched between a first position at which a surface of the intermediate transfer belt is brought into contact with the image carrier and a second position at which the intermediate transfer belt is separated from the image carrier, the intermediate transfer roller being one of the plurality of rollers; an image density sensor being a sensor that detects the toner image on the intermediate transfer belt, a position of the image density sensor relative to the intermediate transfer belt varying depending on whether the intermediate transfer roller is located at the first position or the second position; and a controller that determines whether the intermediate transfer roller is located at the first position or the second position based on a detection value of the image density sensor.

According to the above-described configuration, a determination of press-contact or separation of the intermediate transfer roller can be made based on a change in a relative position between the intermediate transfer belt and the image density sensor, and thus no toner image is required to be formed for the determination, and unnecessary toner consumption can be eliminated.

In addition, in the image forming device, the controller may be configured not to permit the image former to form the toner image when determining that the intermediate transfer roller is located at the second position.

According to the above-described configuration, when it is determined that the intermediate transfer roller is located at the second position (in a separated state), the formation of the toner image is not permitted, and thus image formation causing unnecessary toner consumption can be effectively prevented.

The image forming device may further include: a driving roller that is one of the plurality of rollers and moves and rotates the intermediate transfer belt in a predetermined moving direction; and a transfer member disposed so as to be in contact with the surface of the intermediate transfer belt on the driving roller and rotate together with the intermediate transfer belt, the transfer member transferring the toner image intermediately transferred on the intermediate transfer belt onto a sheet by holding and feeding the sheet with a nip portion which is a contact region with the intermediate transfer belt, wherein the image density sensor may be disposed downstream of the intermediate transfer belt and upstream of the nip portion in the moving direction of the intermediate transfer belt.

According to the above-described configuration, the image density sensor can be disposed at a position at which the relative position with respect to the intermediate transfer belt greatly varies depending on press-contact or separation of the intermediate transfer belt.

The image forming device may further include an opposite roller which is one of the plurality of rollers and is disposed at a position opposite to the image density sensor. The opposite roller may move the intermediate transfer belt to a position at which a distance between the surface of the intermediate transfer belt and the image density sensor becomes a predetermined distance when the intermediate transfer roller is located at the first position, and move the intermediate transfer belt to a position at which the distance between the surface of the intermediate transfer belt and the image density sensor becomes larger than the predetermined distance when the intermediate transfer roller is located at the second position.

According to the above-described configuration, by providing the opposite roller at the position opposite to the image density sensor, the distance between the intermediate transfer belt and the image density sensor can be changed with high accuracy depending on press-contact or separation of the intermediate transfer belt.

In the image forming device, the image density sensor may include a light emitter that emits light toward the intermediate transfer belt, and a light receiver that receives reflected light from the intermediate transfer belt and outputs an output signal in accordance with a light amount received. In determining whether the intermediate transfer roller is located at the first position or the second position, the controller causes the light emitter to emit light and determines that the intermediate transfer roller is located at the first position when a value of the output signal from the light receiver, which is a detection value detected by the image density sensor, falls within a predetermined determination range, and determines that the intermediate transfer roller is located at the second position when the value of the output signal from the light receiver does not fall within the predetermined determination range.

The image forming device may further include a display, and when the intermediate transfer roller is located at the second position, the controller may display on the display that the intermediate transfer belt is in a state of being separated from the image carrier.

In the image forming device, the image former may include a charging roller that is supplied with a charging bias having a predetermined voltage value and charges the image carrier to a predetermined potential, an exposure device that exposes the image carrier charged to the predetermined potential to form an electrostatic latent image, and a development device that accommodates toner and develops the electrostatic latent image with the toner by being supplied with a developing bias having a predetermined voltage value. After it is determined that the intermediate transfer roller is located at the first position, in a state in which supply of the charging bias to the charging roller and supply of the developing bias to the development device are performed, but exposure of the image carrier by the exposure device is not performed, the controller may perform a checking operation including an image forming operation of forming the toner image to the image carrier and an intermediate transfer operation with respect to the intermediate transfer belt, and may determine that the charging roller is in a state of being in contact with the image carrier when the image density sensor does not detect the toner image within a predetermined time as a time during which the checking operation is performed, and determine that the charging roller is in an abnormal state of being not in contact with the image carrier when the image density sensor detects the toner image within the predetermined time.

Advantageous Effects of Disclosure

The image forming device of the disclosure is capable of determining whether the intermediate transfer roller is in the press-contact state or the separated state with respect to the image carrier without toner consumption by making a determination of the press-contact or the separation of the intermediate transfer roller based on a change in a relative position between the intermediate transfer belt and the image density sensor.

DESCRIPTION OF EMBODIMENTS

First Embodiment

Figure 1:
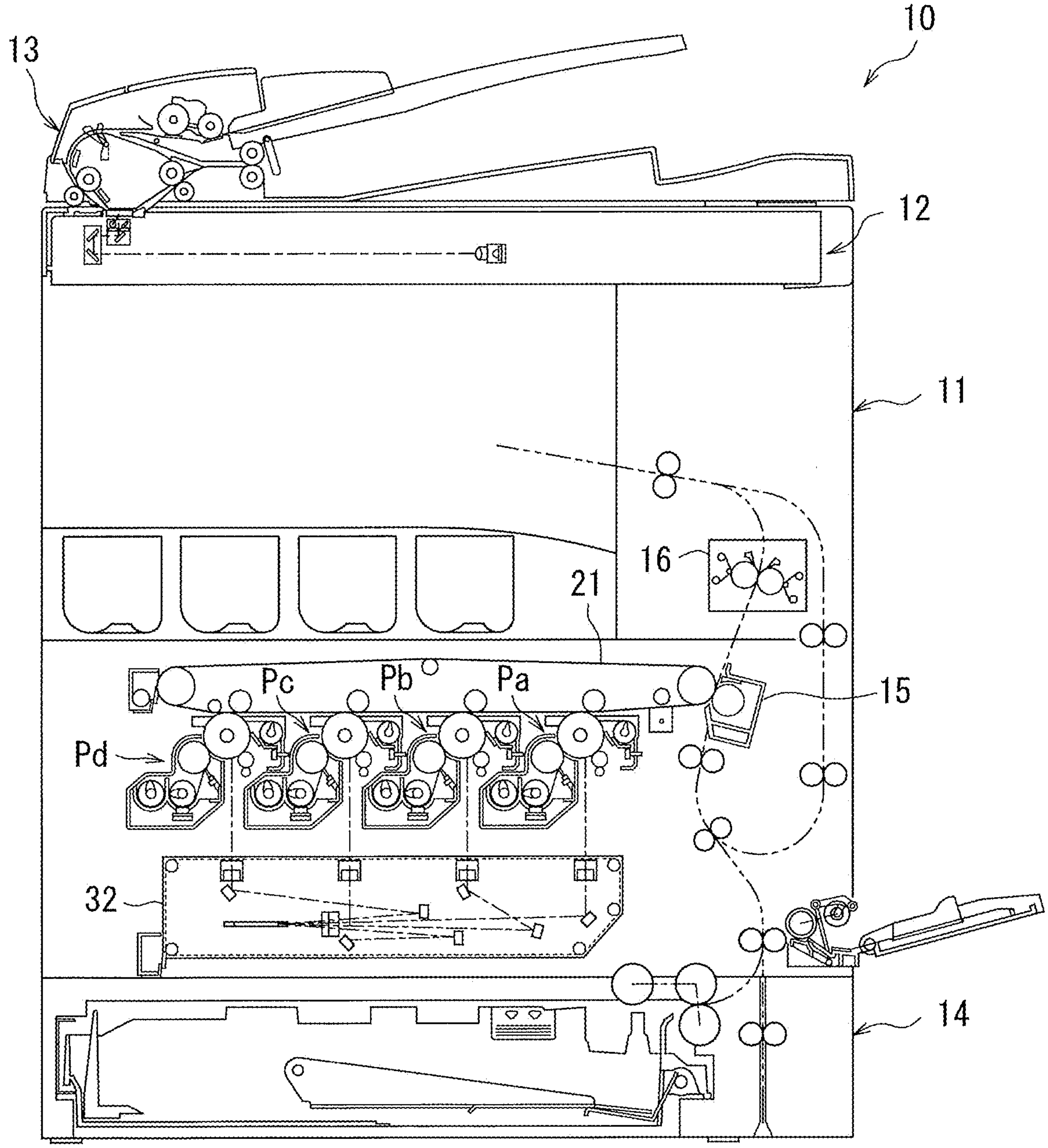
FIG. 1 is a schematic configuration diagram illustrating a basic configuration of an image forming device of the disclosure.

An embodiment according to the disclosure will be described in detail below with reference to the drawings. FIG. 1 is a schematic configuration diagram illustrating a basic configuration of an image forming device 10 of the disclosure.

As illustrated in FIG. 1, the image forming device 10 includes a main body 11, a document reader 12, a document feeding device 13, and a sheet feeding device 14. The main body 11 includes therein an image former for forming (printing) an image on a recording sheet. The document reader 12 is disposed above the main body 11 and reads a document when the document is copied. In an automatic reading mode, the document feeding device 13 sequentially feeds documents placed on a document set tray toward a document table of the document reader 12. The sheet feeding device 14 includes at least one sheet feeding cassette that stocks recording sheets and feeds the recording sheets from a selected sheet feeding cassette toward the main body 11 while separating the recording sheets one by one. In the main body 11, an image is formed on the recording sheet fed from the sheet feeding device 14.

Image data handled in the image forming device 10 correspond to a color image composed of colors of black (K), cyan (C), magenta (M), and yellow (Y), or a monochrome image composed of a single color (e.g., black).

Thus, the image forming device 10 includes four process units Pa to Pd corresponding to black, cyan, magenta, and yellow as the image former. The process units Pa to Pd include photoreceptor drums 30*a* to 30*d* (image carriers, see FIG. 2 and the like), respectively, and form toner images in accordance with image data on the corresponding photoreceptor drums 30*a* to 30*d* using a known electrophotographic process.

The toner images formed on the photoreceptor drums 30*a* to 30*d* of the process units Pa to Pd are intermediately transferred and superimposed on an intermediate transfer belt 21 in a sequential manner (primary transfer). As a result, a color toner image is formed on the intermediate transfer belt 21. The color toner image on the intermediate transfer belt 21 is transferred onto a recording sheet by the secondary transfer device 15 (secondary transfer), and the recording sheet is heated and pressed by a fixing unit 16 so that the color image is fixed on the recording sheet. Of course, it is possible to form a monochrome toner image using the process unit Pa only.

Figure 2:
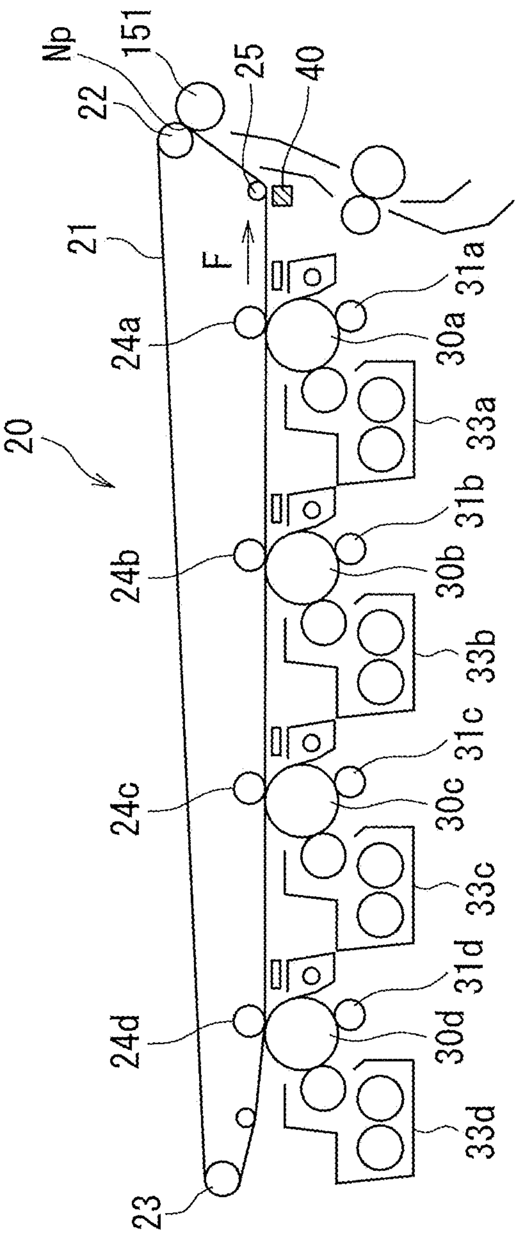
FIG. 2 is a schematic configuration diagram illustrating a peripheral structure of an intermediate transfer unit in a state of being attached to a main body (during color image formation).
Figure 3:
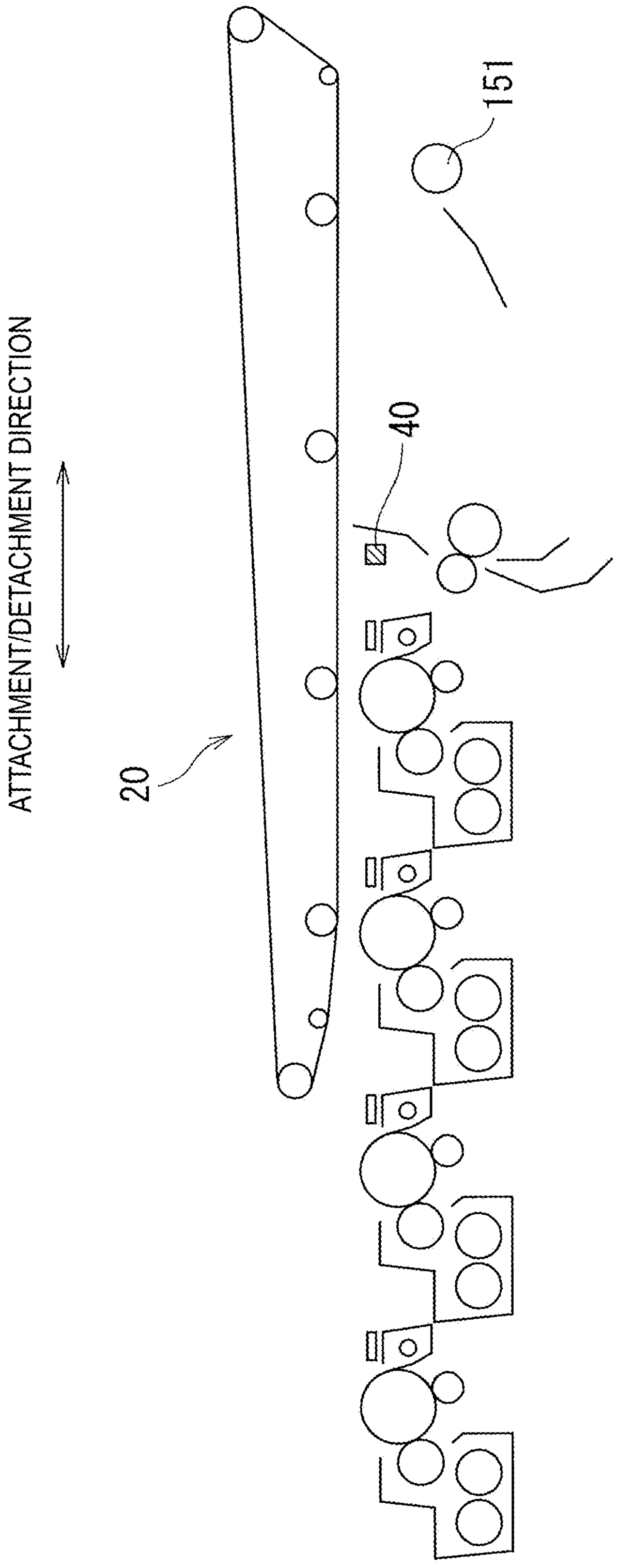
FIG. 3 is a schematic configuration diagram illustrating a peripheral structure of the intermediate transfer unit in a process of being attached or detached.

The image forming device 10 includes an intermediate transfer unit 20 that is attachable to and detachable from the main body 11, and the intermediate transfer belt 21 is included in the intermediate transfer unit 20. FIG. 2 is a schematic configuration diagram illustrating a peripheral structure of the intermediate transfer unit 20 in a state of being attached to the main body 11 (during color image formation). FIG. 3 is a schematic configuration diagram illustrating a peripheral structure of the intermediate transfer unit 20 in a process of being attached or detached.

The intermediate transfer belt 21 is stretched over a plurality of rollers as illustrated in FIG. 2, and the toner images formed on the photoreceptor drums 30*a* to 30*d* are intermediately transferred onto the surface of the intermediate transfer belt 21 as described above. The intermediate transfer unit 20 includes the intermediate transfer belt 21, a driving roller 22, a tension roller 23, and intermediate transfer rollers 24*a* to 24*d*. The driving roller 22, the tension roller 23, and the intermediate transfer rollers 24*a* to 24*d* are the plurality of rollers over which the intermediate transfer belt 21 is stretched, and the driving roller 22 moves and rotates the intermediate transfer belt 21 in a predetermined moving direction F. The tension roller 23 stretches the intermediate transfer belt 21 between the tension roller 23 and the driving roller 22 and applies a predetermined tension to the intermediate transfer belt 21 to prevent the occurrence of slack in the intermediate transfer belt 21, so that the rotational force of the driving roller 22 is reliably transmitted to the intermediate transfer belt 21. The intermediate transfer rollers 24*a* to 24*d* are provided at positions on the inner side of the intermediate transfer belt 21 corresponding to the photoreceptor drums 30*a* to 30*d* (which may be collectively referred to as the photoreceptor drum 30) of the process units Pa to Pd. In FIG. 2 and FIG. 3, only a part of the configuration of the process units Pa to Pd (the photoreceptor drums, charging units (charging rollers 31*a* to 31*d*), development units (development devices 33*a* to 33*c*, which may be collectively referred to as a development device 33), a transfer unit, and a cleaning unit) is illustrated. An exposure device 32 (see FIG. 1) that forms electrostatic latent images on the photoreceptor drums 30*a* to 30*d* by exposure is provided in common to the process units Pa to Pd.

In FIG. 2, as the secondary transfer device 15, only a secondary transfer roller (transfer member) 151 is selectively illustrated. The secondary transfer roller 151 is disposed at a position opposite to the driving roller 22 with the intermediate transfer belt 21 interposed therebetween. The secondary transfer roller 151 is disposed so as to be in contact with the surface of the intermediate transfer belt 21 on the driving roller 22 and rotate together with the intermediate transfer belt 21, and transfers the toner image intermediately transferred on the intermediate transfer belt 21 onto a sheet by holding and feeding the sheet with a nip portion Np which is a contact region with the intermediate transfer belt 21. In the present embodiment, the secondary transfer device 15 is locked to a rotary opening/closing door (not illustrated) provided at a side surface (a right side surface in FIG. 1) of the image forming device 10. Thus, when the opening/closing door is opened, the secondary transfer device 15 is also moved accordingly, and the right side of the intermediate transfer unit 20 is opened as illustrated in FIG. 3, so that the intermediate transfer unit 20 becomes attachable/detachable on the right side of the main body 11. Note that the secondary transfer device 15 according to the present embodiment is a roller-type transfer device including the secondary transfer roller 151, but may be a belt-type transfer device including a secondary transfer belt (transfer member) stretched over the secondary transfer roller 151 and another roller.

In the image forming device 10, at least one of the intermediate transfer rollers can be manually switched between press-contact and separation with respect to the photoreceptor drum. In the present embodiment, in the process unit Pa for black (K), the intermediate transfer roller 24*a* can be manually switched between press-contact and separation with respect to the photoreceptor drum 30*a*. The position of the intermediate transfer roller 24*a* for black (K) can be manually changed between a first position at which the surface of the intermediate transfer belt 21 is brought into contact with the photoreceptor drum 30*a* and a second position at which the intermediate transfer belt 21 is separated from the photoreceptor drum 30*a*. A switching device for manually changing the position will be described in detail below.

Figure 4:
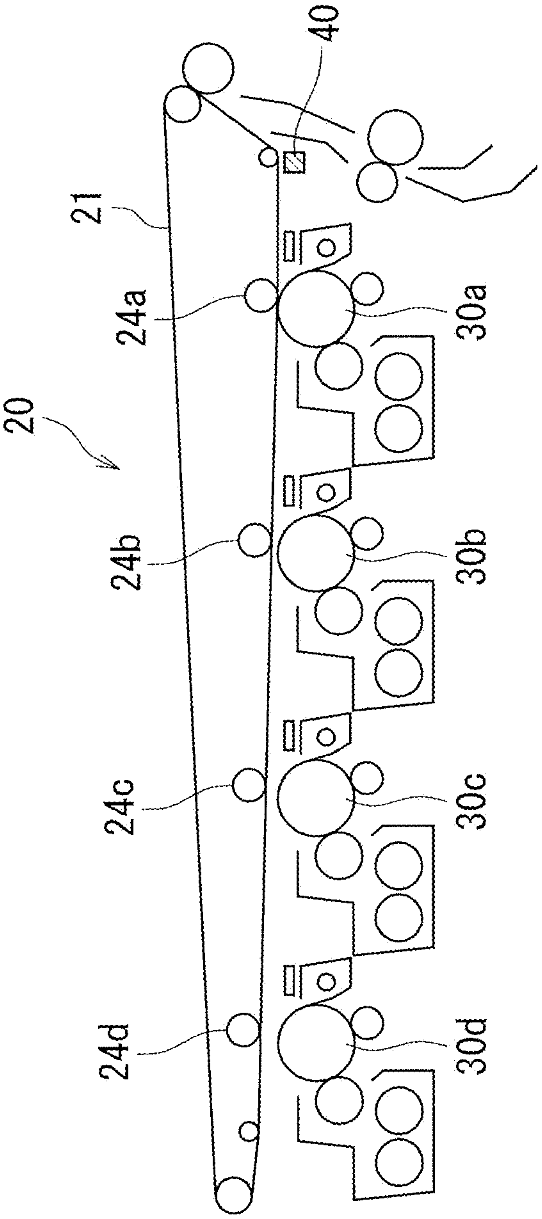
FIG. 4 is a schematic configuration diagram illustrating a peripheral structure of the intermediate transfer unit in a state of being attached to the main body (during monochrome image formation and during standby).

Also in the process units Pb to Pd, the intermediate transfer belt 21 is configured to be switched between press-contact and separation with respect to the photoreceptor drums 30*b* to 30*d*, and this switching is automatically performed. That is, the positions of the intermediate transfer rollers 24*b* to 24*d* are automatically switched such that the intermediate transfer rollers 24*b* to 24*d* move to positions to bring the intermediate transfer belt 21 into press-contact with the photoreceptor drums 30*b* to 30*d* only at color image formation, and move to positions to separate the intermediate transfer belt 21 from the photoreceptor drums 30*b* to 30*d* at monochrome image formation and standby. FIG. 4 is a schematic configuration diagram illustrating a peripheral structure of the intermediate transfer unit 20 in a state of being attached to the main body 11 (during monochrome image formation and during standby), and illustrates a state in which the intermediate transfer belt 21 is separated from the photoreceptor drums 30*b* to 30*d* of the process units Pb to Pd.

Figure 5:
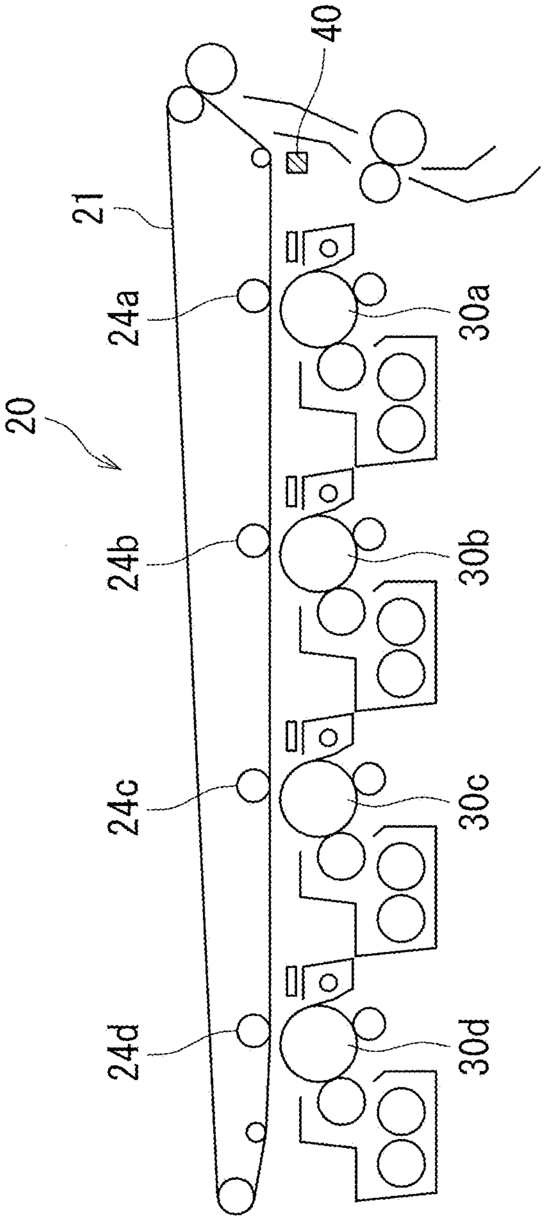
FIG. 5 is a schematic configuration diagram illustrating a peripheral structure of the intermediate transfer unit in a state in which intermediate transfer rollers are separated from photoreceptor drums.

FIG. 5 is a schematic configuration diagram illustrating a peripheral structure of the intermediate transfer unit 20 in a state in which the intermediate transfer rollers 24*a* to 24*d* are located at the second position. The state illustrated in FIG. 5 is, for example, a state in which the intermediate transfer unit 20 is attached to or detached from the main body 11 for maintenance or the like. By bringing the intermediate transfer belt 21 into a state of being separated from the photoreceptor drums 30*a* to 30*d*, the intermediate transfer unit 20 can be attached to or detached from the main body of the image forming device 10 without the intermediate transfer belt 21 rubbed by the photoreceptor drum 30*a*. The intermediate transfer roller 24*a* is also in the separated state when the image forming device 10 is transported for shipment or the like. As a result, friction between the intermediate transfer belt 21 and the photoreceptor drum 30*a* due to vibration or the like during transportation can be prevented. The intermediate transfer roller 24*a* in the separated state is manually switched to the press-contact state by a service person after maintenance or after installation. In the state of FIG. 5, the intermediate transfer rollers 24*b* to 24*d* are brought into the separated state by automatic switching.

Since the intermediate transfer roller 24*a* is manually switched between the press-contact state and the separated state, there is a possibility that the intermediate transfer roller 24*a* is mistakenly not returned to the press-contact state from the separated state. When the image forming device 10 is transported or the like, cabinets (e.g., the opening/closing door) of the image forming device 10 are closed with the intermediate transfer roller 24*a* being left in the separated state, and thus the intermediate transfer roller 24*a* that has not been returned to the press-contact state is unlikely to be noticed by visual observation or the like. For this reason, the image forming device 10 has a function of determining press-contact or separation of the intermediate transfer roller 24*a* (press-contact/separation determination). The press-contact/separation determination will be described below.

The image forming device 10 includes an image density sensor 40 (see FIG. 2 and the like), and determines the press-contact or the separation of the intermediate transfer roller 24*a* with the image density sensor 40. In general, an image forming device includes an image density sensor for performing image density adjustment (so-called process control), and the image density sensor 40 can also serve as an image density sensor used for the image density adjustment.

As illustrated in FIG. 2 to FIG. 5, the image density sensor 40 is disposed downstream of an intermediate transfer position of the process unit Pa (i.e., the position at which the intermediate transfer roller 24*a* is disposed) and upstream of a secondary transfer position (i.e., the position at which the secondary transfer roller 151 is disposed) in a rotation direction of the intermediate transfer belt 21 (the direction of an arrow F in FIG. 2). That is, the position at which the image density sensor 40 is disposed is a position at which a relative position with respect to the intermediate transfer belt 21 changes in accordance with the displacement of the intermediate transfer belt 21 depending on the press-contact or the separation of the intermediate transfer roller 24*a*, and is preferably a position at which a relative displacement amount is large. The image density sensor 40 faces a surface (a surface onto which a toner image is transferred) of the intermediate transfer belt 21.

The intermediate transfer unit 20 may include an opposite roller 25 (see FIG. 2 and the like) at a position opposite to the image density sensor 40. The opposite roller 25 moves simultaneously with the intermediate transfer roller 24*a* in the manual switching of the intermediate transfer roller 24*a* so as to approach the image density sensor 40 when the intermediate transfer roller 24*a* is brought into the press-contact state and move away from the image density sensor 40 when the intermediate transfer roller 24*a* is brought into the separated state. Accordingly, when the intermediate transfer roller 24*a* is located at the first position, the opposite roller 25 moves the intermediate transfer belt 21 to a position at which the distance between the surface of the intermediate transfer belt 21 and the image density sensor 40 becomes a predetermined distance. On the other hand, when the intermediate transfer roller 24*a* is located at the second position, the opposite roller 25 moves the intermediate transfer belt 21 to a position at which the distance between the surface of the intermediate transfer belt 21 and the image density sensor 40 becomes larger than the predetermined distance. By providing the opposite roller 25 to the intermediate transfer unit 20, the distance between the intermediate transfer belt 21 and the image density sensor 40 can be changed with high accuracy.

Figure 6:
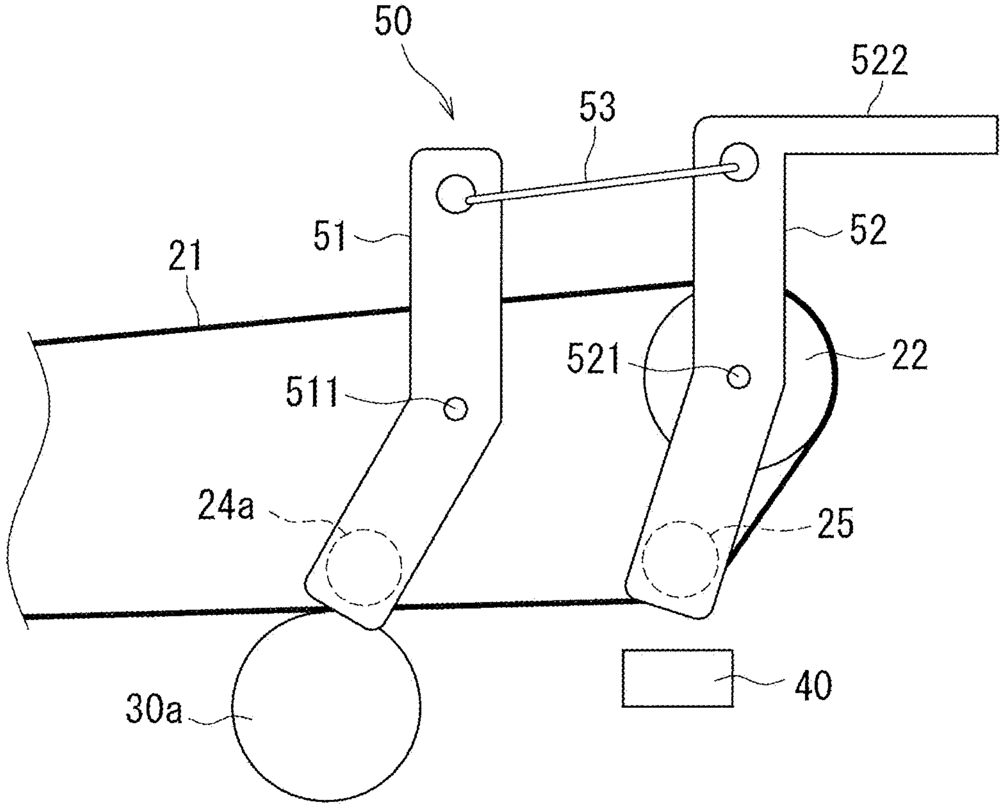
FIG. 6 is a schematic configuration diagram illustrating an example of a switching mechanism for manually changing positions of an intermediate transfer roller and an opposite roller, and illustrates a case in which the intermediate transfer roller is in a press-contact state.
Figure 7:
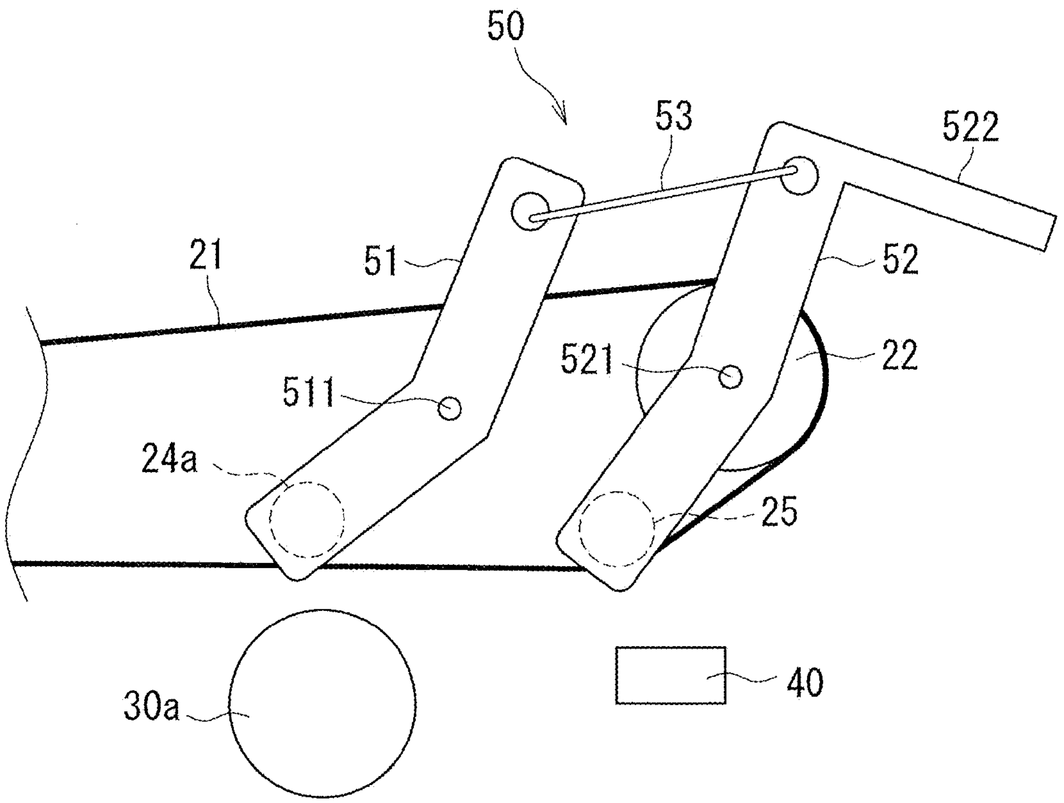
FIG. 7 is a schematic configuration diagram illustrating an example of a switching mechanism for manually changing positions of an intermediate transfer roller and an opposite roller, and illustrates a case in which the intermediate transfer roller is in a separated state.

FIG. 6 and FIG. 7 are schematic configuration diagrams illustrating examples of a switching mechanism 50 that changes the positions of the intermediate transfer roller 24*a* and the opposite roller 25 through a manual operation. FIG. 6 illustrates a case in which the intermediate transfer roller 24*a* is in the press-contact state, and FIG. 7 illustrates a case in which the intermediate transfer roller 24*a* is in the separated state.

The switching mechanism 50 includes a first bearing member 51, a second bearing member 52, and a link member 53. The first bearing member 51 is an elongated member and is rotatable around a rotary shaft 511 near the center in a longitudinal direction. The first bearing member 51 pivotally supports the rotary shaft of the intermediate transfer roller 24*a* at one end side in the longitudinal direction and is connected to the link member 53 at the other end side. The second bearing member 52 is an elongated member and is rotatable around a rotary shaft 521 near the center in the longitudinal direction. The second bearing member 52 pivotally supports the rotary shaft of the opposite roller 25 at one end side in the longitudinal direction and is connected to the link member 53 at the other end side. The second bearing member 52 includes an operation portion 522 for receiving a manual switching operation by an operator. In the present embodiment, the operation portion 522 is provided in a lever shape on the same side as the side connected to the link member 53, but the shape of the operation portion 522 is not particularly limited.

Switching between the press-contact and the separation of the intermediate transfer roller 24*a* is performed by the operator turning the second bearing member 52 via the operation portion 522. That is, the turning operation of the second bearing member 52 is transmitted to the first bearing member 51 via the link member 53, and thus the first bearing member 51 and the second bearing member 52 turn simultaneously. Thus, the intermediate transfer roller 24*a* can be switched to the separated state by the operation from the state illustrated in FIG. 6 to the state illustrated in FIG. 7, and the intermediate transfer roller 24*a* can be returned to the press-contact state by the reverse operation.

The switching mechanism 50 can hold the intermediate transfer roller 24*a* in the press-contact state (the state illustrated in FIG. 6) and the separated state (the state illustrated in FIG. 7) by a lock mechanism (not illustrated) or the like. When the intermediate transfer unit 20 does not include the opposite roller 25, the second bearing member 52 and the link member 53 can be omitted from the switching mechanism 50. In this case, the operation portion is provided at the first bearing member 51.

Figure 8A:
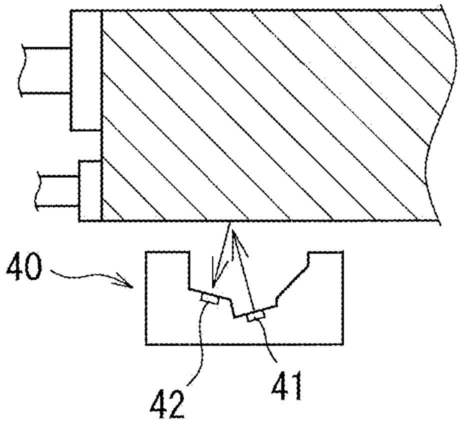
FIG. 8A is a side view of an intermediate transfer belt and an image density sensor as viewed from a driving roller side, and illustrates a press-contact state of an intermediate transfer roller.
Figure 8B:
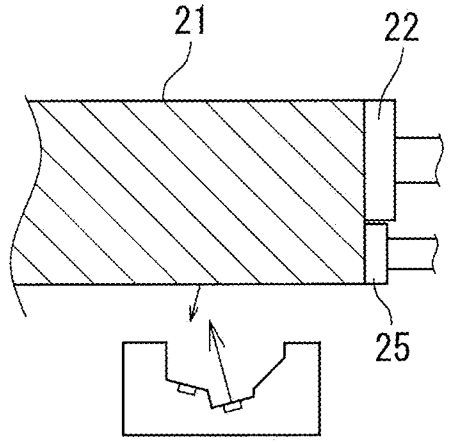
FIG. 8B is a side view of the intermediate transfer belt and the image density sensor as viewed from the driving roller side, and illustrates a separated state of an intermediate transfer roller.

FIG. 8A and FIG. 8B are side views of the intermediate transfer belt 21 and the image density sensor 40 as viewed from the driving roller 22 side. In the present embodiment, two image density sensors 40 are provided along the width direction (a direction orthogonal to the rotation direction) of the intermediate transfer belt 21, but the number of image density sensors 40 is not particularly limited. The image density sensor 40 includes a light emitter 41 and a light receiver 42. The light emitter 41 emits light toward the intermediate transfer belt 21, and the light receiver 42 receives reflected light. FIG. 8A illustrate the press-contact state of the intermediate transfer roller 24*a*, and FIG. 8B illustrates the separated state of the intermediate transfer roller 24*a*.

Figure 9:
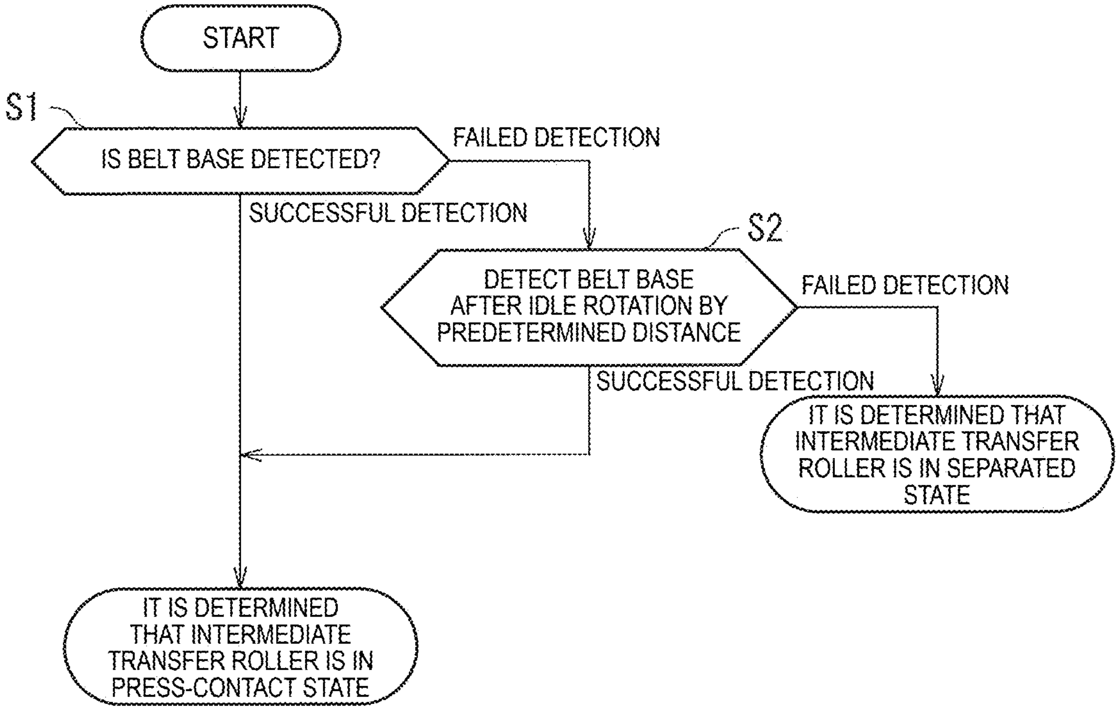
FIG. 9 is a flowchart showing an example of press-contact/separation determination for the intermediate transfer rollers in the image forming device.
Figure 10:
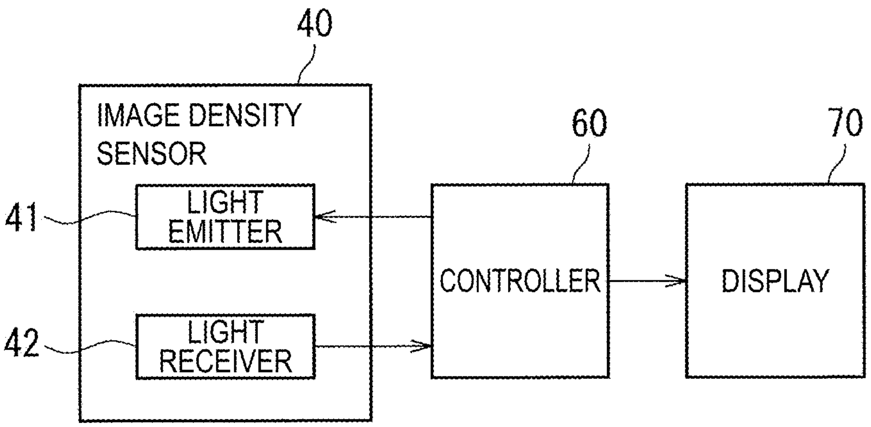
FIG. 10 is a block diagram of a control system that performs the press-contact/separation determination.

FIG. 9 is a flowchart showing an example of press-contact/separation determination in the image forming device 10. FIG. 10 is a block diagram of a control system that performs the press-contact/separation determination. As illustrated in FIG. 10, the image forming device 10 includes a controller 60, and the controller 60 performs light emission control for the light emitter 41 and light reception detection control for the light receiver 42 in the press-contact/separation determination. In addition, the controller 60 determines the press-contact or the separation of the intermediate transfer roller 24*a* based on a detection value of the image density sensor 40 (the value of an output signal from the light receiver 42). The press-control/separation determination described below is preferably performed, for example, immediately after the image forming device 10 is powered on.

In the press-contact/separation determination of FIG. 9, first, the image density sensor 40 detects the belt base of the intermediate transfer belt 21 in a state in which a toner image (toner pattern) is not transferred to the intermediate transfer belt 21 (S1). At this time, the intermediate transfer belt 21 is not necessarily rotated.

In S1, when the intermediate transfer roller 24*a* is located at the first position (in the press-contact state), the distance between the intermediate transfer belt 21 and the image density sensor 40 is a predetermined distance. Since the belt base of the intermediate transfer belt 21 is substantially a mirror surface, the light emitted from the light emitter 41 is totally reflected by the belt base of the intermediate transfer belt 21, and the amount of the light received by the light receiver 42 is maximum. The light receiver 42 outputs, to the controller 60, an output value (voltage value) corresponding to the amount of the light received. In the image density sensor 40, the amount of light of the light emitter 41 is adjusted such that the output value of the light receiver 42 when the intermediate transfer roller 24*a* is in the press-contact state becomes a reference value (e.g., 3 V). Thus, in a state in which the intermediate transfer roller 24*a* is located at the first position, the output value of the light receiver 42 is always the reference value, and does not fall below, for example, 2.7 V which is lower than the reference value by a predetermined voltage.

On the other hand, when the intermediate transfer roller 24*a* is located at the second position (in the separated state), the relative position of the intermediate transfer belt 21 with respect to the image density sensor 40 is changed from the relative position in the press-contact state. For example, the intermediate transfer belt 21 moves away from the image density sensor 40, or the angle of the belt surface changes at a position opposite to the image density sensor 40. Both changes in the distance and the angle significantly reduce the amount of light received by the light receiver 42 as compared with when the intermediate transfer roller 24*a* is in the press-contact state. Thus, in the separated state, the amount of light received is substantially 0.

Accordingly, in S1, it is determined whether the detection value of the image density sensor 40 falls within a predetermined determination range, and when the detection value falls within the determination range, that is, when the detection value of the image density sensor 40 falls within a determination threshold value range between a determination threshold value and a reference value, it is determined that the belt base has been detected (successful detection). On the other hand, when the detection value does not fall within the determination range, that is, when the detection value does not fall within the determination threshold value range between the determination threshold value and the reference value, it is determined that the belt base has not been detected (failed detection). In the case of successful detection in S1, the intermediate transfer belt 21 is close to the image density sensor 40, and thus it is determined that the intermediate transfer roller 24*a* is in the press-contact state. In the case of failed detection in S1, there is a possibility that the intermediate transfer belt 21 is not close to the image density sensor 40, and the processing proceeds to step 2. Whether the detection value of the image density sensor 40 is within the predetermined determination range can be determined, for example, such that the detection value of the image density sensor 40 is compared with a predetermined determination threshold value (a value lower than the above-described reference value, for example, 0.3 V), and it is determined that the detection value is within the determination range when the detection value is greater than the determination threshold value and that detection value is not within the determination range when the detection value is equal to or smaller than the determination threshold value.

In S2, after the intermediate transfer belt 21 is idly rotated by a predetermined distance, the image density sensor 40 detects the belt base of the intermediate transfer belt 21 again. In the case of successful detection in S2, it is determined that the intermediate transfer roller 24*a* is in the press-contact state. In the case of failed detection in S2, it is determined that the intermediate transfer roller 24*a* is in the separated state.

In the flow of FIG. 9, the step of S2 is provided so as to eliminate erroneous detection and improve determination accuracy. In the case of failed detection in S1, there is a possibility that a toner image might have remained on the intermediate transfer belt 21 even though the intermediate transfer roller 24*a* was in the press-contact state, and the image density sensor 40 might have detected the remaining toner image, resulting in the failed detection. The toner image on the surface of the intermediate transfer belt 21 absorbs the light emitted from the light emitter 41 (in the case of black toner) or diffuses and reflects the light (in the case of color toner), and thus, in either case, the amount of the light received by the light receiver 42 decreases (failed detection).

For this reason, in the case of failed detection in S1, the detection of the belt base is performed again on another surface of the intermediate transfer belt 21 in S2, whereby erroneous detection due to the remaining toner image can be prevented. The predetermined distance by which the intermediate transfer belt 21 is idly rotated in S2 is preferably a distance by which the remaining toner image on the intermediate transfer belt 21 can reliably pass through the image density sensor 40, and, specifically, a distance from the intermediate transfer position of the photoreceptor drum 30*d*, which is farthest from the image density sensor 40, to the image density sensor 40.

However, the step of S2 is not essential to the disclosure and may be omitted. When the step of S2 is omitted, it is determined that the intermediate transfer roller 24*a* is in the separated state in the case of failed detection in S1.

When it is finally determined that the intermediate transfer roller 24*a* is in the separated state by the press-contact/separation determination, the image forming device 10 can notify a user that the intermediate transfer roller 24*a* is in the separated state. The notification in this case is preferably a notification by an indication on a display 70 (see FIG. 10) provided at the image forming device 10, but may also be a notification by sound or the like. When the intermediate transfer roller 24*a* is in the separated state, the image forming device 10 preferably does not permit execution of a printing job (formation of a toner image at the process units Pa to Pd) in order to prevent wasteful toner consumption.

As described above, the press-contact/separation determination in the image forming device 10 of the disclosure is performed by detecting the belt base of the intermediate transfer belt 21 in accordance with a change in the relative position between the intermediate transfer belt 21 and the image density sensor 40. Thus, formation of a toner image for the determination is not required, and wasteful toner consumption can be eliminated. In addition, in performing the press-contact/separation determination, since no operation of intermediately transferring a toner image from the photosensitive drum 30 to the intermediate transfer belt 21 is required, the time required for the determination can be shortened as compared to the determination method of Patent Document 1. Since the image density sensor 40 used for the determination also serves as an image density sensor used for the process control, the number of components required for the determination is not increased and the cost is not increased.

Second Embodiment

In the image forming device 10 of the present embodiment, each of the charging rollers 31*a* to 31*d* (see FIG. 2 and the like, may be collectively referred to as a charging roller 31) in the process units Pa to Pd is provided so as to be biased by a biasing member to be in contact with the photoreceptor drum 30 at a predetermined pressure and rotate together with the photoreceptor drum 30. Alternatively, a known separation/contact mechanism may be provided so that separation and contact with respect to the photoreceptor drum 30 are possible. In the case of the charging roller 31 that can be separated from and brought into contact with the photoreceptor drum 30, it is preferable that the contact state of the charging roller 31 with respect to the photoreceptor drum 30 can be determined. Further, even in the case of the charging roller 31 that cannot be separated from and brought into contact with the photoreceptor drum 30, the contact state of the charging roller 31 with respect to the photoreceptor drum 30 may become defective, and thus it is preferable that the contact state of the charging roller 31 can be determined similarly. The image forming device 10 can also determine the contact state of the charging roller 31 using the image density sensor 40. Hereinafter, determination of the contact state of the charging roller 31 will be described.

Figure 11:
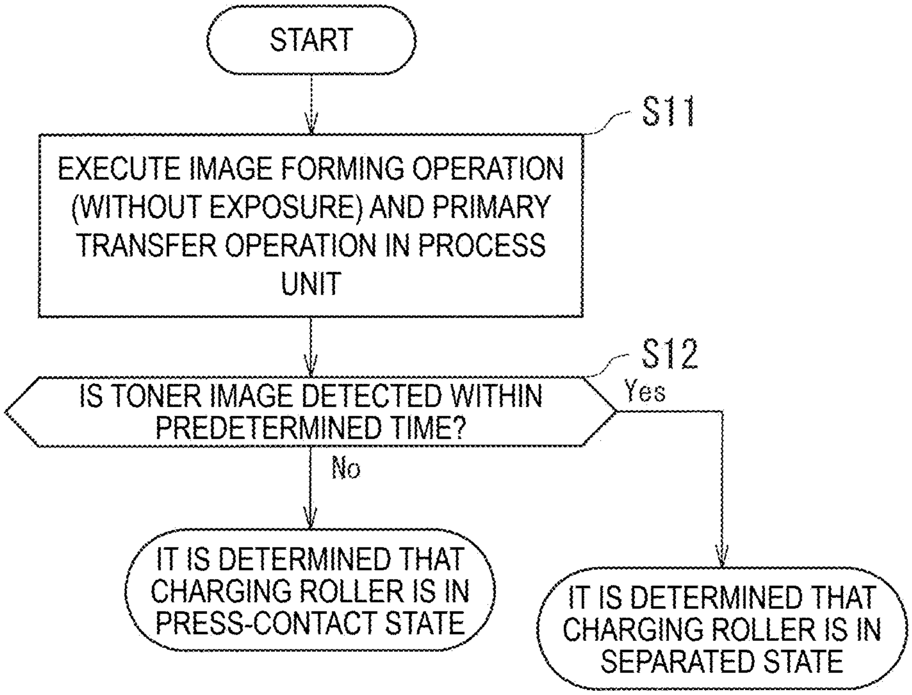
FIG. 11 is a flowchart showing an example of determining press-contact or separation of a charging roller in the image forming device.

FIG. 11 is a flowchart showing an example of the determination of the contact state of the charging roller 31 in the image forming device 10. The control flow of FIG. 11 is executed in the process unit Pa after it is determined that the intermediate transfer roller 24*a* is in the press-contact state in the control flow of FIG. 9 in the first embodiment. In addition, the control flow of FIG. 11 can be executed in each of the process units Pb to Pd, but in this case, the control flow is performed after the intermediate transfer rollers 24*b* to 24*d* are brought into the press-contact state.

In the determination of the contact state of FIG. 11, first, a checking operation is performed in the process unit subjected to the determination (S11). The checking operation includes an image forming operation of forming a toner image (forming a toner pattern for the determination) on the photoreceptor drum and an intermediate transfer operation with respect to the intermediate transfer belt 21. In the image forming operation at this time, a charging bias in the charging roller 31 and a developing bias in the development device 33 are normally applied, but exposure of the photoreceptor drum 30 by the exposure device 32 is not performed. In the photoreceptor drum 30, an exposure region is an image region, and a non-exposure region is a non-image region.

Subsequently, it is determined whether a toner image is detected by the image density sensor 40 within a predetermined time (S12). The predetermined time in this case is, for example, a time that has elapsed from the start of the checking operation, and is set in accordance with the process unit subjected to the determination.

When the charging roller 31 is in a contact state, the photoreceptor drum 30 is normally charged, and the exposure is not performed, so that the entire region becomes the non-image region. That is, when no toner image is detected in S12 (NO in S12), it is determined that the charging roller 31 is in the contact state.

On the other hand, when the contact state of the charging roller 31 is bad (for example, an improper contact state due to one-sided contact or poor contact pressure), the photoreceptor drum 30 is not normally charged as a matter of course. Thus, a potential difference from the developing bias is caused on the surface of the photoreceptor drum 30, and a toner image (a solid image) is formed even though the surface of the photoreceptor drum 30 is not exposed. Since the formed toner image is intermediately transferred to the intermediate transfer belt 21, when the toner image is detected in S12 (YES in S12), it is determined that the charging roller 31 is in an abnormal state of being not in contact with the photoreceptor drum 30.

The embodiments disclosed herein are illustrative in all respects and are not the basis for a limited interpretation. Accordingly, the technical scope of the disclosure shall not be construed by the foregoing embodiments only, and is defined based on the description of the claims.

REFERENCE SIGNS LIST

10 Image forming device
15 Secondary transfer device
151 Secondary transfer roller (transfer member)
20 Intermediate transfer unit
21 Intermediate transfer belt
22 Driving roller
23 Tension roller
24*a* to 24*d* Intermediate transfer roller
25 Opposite roller
30*a* to 30*d* Photoreceptor drum (image carrier)
31*a* to 31*d* Charging roller
32 Exposure device
33*a* to 33*d* Development device
40 Image density sensor
50 Switching mechanism
60 Controller
70 Display
Pa to Pd Process unit (image former)

The invention claimed is:

1. An image forming device comprising:

an image former including an image carrier, the image former forming a toner image on the image carrier;

an intermediate transfer belt onto which the toner image on the image carrier is intermediately transferred, the intermediate transfer belt being stretched over a plurality of rollers;

an intermediate transfer roller whose position can be manually switched between a first position at which a surface of the intermediate transfer belt is brought into contact with the image carrier and a second position at which the intermediate transfer belt is separated from the image carrier, the intermediate transfer roller being one of the plurality of rollers;

an image density sensor being a sensor that detects the toner image on the intermediate transfer belt, a position of the image density sensor relative to the intermediate transfer belt varying depending on whether the intermediate transfer roller is located at the first position or at the second position; and a controller that determines whether the intermediate transfer roller is located at the first position or at the second position based on a detection value of the image density sensor.

2. The image forming device according to claim 1, wherein the controller does not permit the image former to form the toner image when determining that the intermediate transfer roller is located at the second position.

3. The image forming device according to claim 1, further comprising:

a driving roller that is one of the plurality of rollers and moves and rotates the intermediate transfer belt in a predetermined moving direction, and a transfer member disposed so as to be in contact with the surface of the intermediate transfer belt on the driving roller and rotate together with the intermediate transfer belt, the transfer member transferring the toner image intermediately transferred on the intermediate transfer belt onto a sheet by holding and feeding the sheet with a nip portion which is a contact region with the intermediate transfer belt, wherein the image density sensor is disposed downstream of the intermediate transfer roller and upstream of the nip portion in the moving direction of the intermediate transfer belt.

4. The image forming device according to claim 1, further comprising:

an opposite roller which is one of the plurality of rollers and is disposed at a position opposite to the image density sensor, wherein the opposite roller moves the intermediate transfer belt to a position at which a distance between the surface of the intermediate transfer belt and the image density sensor becomes a predetermined distance when the intermediate transfer roller is located at the first position, and moves the intermediate transfer belt to a position at which the distance between the surface of the intermediate transfer belt and the image density sensor becomes larger than the predetermined distance when the intermediate transfer roller is located at the second position.

5. The image forming device according to claim 1, wherein the image density sensor includes a light emitter that emits light toward the intermediate transfer belt, and a light receiver that receives reflected light from the intermediate transfer belt and outputs an output signal in accordance with a light amount received, in determining whether the intermediate transfer roller is located at the first position or the second position, the controller causes the light emitter to emit light and determines that the intermediate transfer roller is located at the first position when a value of the output signal from the light receiver, which is a detection value detected by the image density sensor, falls within a predetermined determination range, and determines that the intermediate transfer roller is located at the second position when the value of the output signal from the light receiver does not fall within the predetermined determination range.

6. The image forming device according to claim 1, further comprising:

a display, wherein when the intermediate transfer roller is located at the second position, the controller displays on the display that the intermediate transfer belt is in a state of being separated from the image carrier.

7. The image forming device according to claim 1, wherein the image former includes a charging roller that is supplied with a charging bias having a predetermined voltage value and charges the image carrier to a predetermined potential, an exposure device that exposes the image carrier charged to the predetermined potential to form an electrostatic latent image, and a development device that accommodates toner and develops the electrostatic latent image with the toner by being supplied with a developing bias having a predetermined voltage value, the controller after it is determined that the intermediate transfer roller is located at the first position, performs a checking operation including an image forming operation of forming the toner image to the image carrier and an intermediate transfer operation with respect to the intermediate transfer belt, and in a state in which supply of the charging bias to the charging roller and supply of the developing bias to the development device are performed, but exposure of the image carrier by the exposure device is not performed, and determines that the charging roller is in a state of being in contact with the image carrier when the image density sensor does not detect the toner image within a predetermined time as a time during which the checking operation is performed, and determines that the charging roller is in an abnormal state of being not in contact with the image carrier when the image density sensor detects the toner image within the predetermined time.

* * * * *